US011962010B2

(12) United States Patent
Okubo et al.

(10) Patent No.: US 11,962,010 B2
(45) Date of Patent: Apr. 16, 2024

(54) BINDER AQUEOUS SOLUTION FOR LITHIUM-ION BATTERY ELECTRODE, SLURRY FOR LITHIUM-ION BATTERY ELECTRODE, LITHIUM-ION BATTERY ELECTRODE, AND LITHIUM-ION BATTERY

(71) Applicant: ARAKAWA CHEMICAL INDUSTRIES, LTD., Osaka (JP)

(72) Inventors: Katsuya Okubo, Osaka (JP); Hideki Goda, Osaka (JP); Naoki Sasagawa, Osaka (JP); Satoru Aoyama, Osaka (JP)

(73) Assignee: ARAKAWA CHEMICAL INDUSTRIES, LTD., Osaka (JP)

( * ) Notice: Subject to any disclaimer, the term of this patent is extended or adjusted under 35 U.S.C. 154(b) by 461 days.

(21) Appl. No.: 17/009,780

(22) Filed: Sep. 2, 2020

(65) Prior Publication Data

US 2021/0075019 A1 Mar. 11, 2021

(30) Foreign Application Priority Data

Sep. 5, 2019 (JP) ................................. 2019-161654

(51) Int. Cl.
*H01M 4/62* (2006.01)
*H01M 4/13* (2010.01)
*H01M 4/88* (2006.01)
*H01M 10/05* (2010.01)
*H01M 10/0525* (2010.01)

(52) U.S. Cl.
CPC ............. *H01M 4/622* (2013.01); *H01M 4/13* (2013.01); *H01M 4/8828* (2013.01); *H01M 10/0525* (2013.01)

(58) Field of Classification Search
None
See application file for complete search history.

(56) References Cited

U.S. PATENT DOCUMENTS

2012/0225199 A1* 9/2012 Muthu .................. H01M 4/133 427/126.6
2012/0244427 A1* 9/2012 Hashimoto .............. C08K 5/55 429/200
2015/0155539 A1* 6/2015 Park .................... H01M 50/451 525/244
2018/0175366 A1* 6/2018 Zheng ................. H01M 4/1391

FOREIGN PATENT DOCUMENTS

JP 2011142073 7/2011
JP 2013008485 1/2013
JP 2015106488 6/2015
JP 2015118908 6/2015
JP 2015128013 7/2015
JP 2018522017 8/2018
JP 2019110002 7/2019
KR 20190074228 * 6/2019 .............. C08F 22/56
WO 2015098507 7/2015

OTHER PUBLICATIONS

Office Action of Korea Counterpart Application, with English translation thereof, dated Oct. 30, 2020, pp. 1-7.
Office Action of Korea Counterpart Application, with English translation thereof, dated Apr. 27, 2021, pp. 1-8.
"Written prior art research report (for priority review)", issued on Sep. 22, 2020, with English translation thereof, p. 1-p. 8.
Y.M. Shaikhutdinovi. et al., "Surface—Active and Complexforming Copolymers of Sodium 2-acrylamido-2-methylpropanesulfonate with Ethyleneglycol Vinyl Ether", Eurasian Chemico-Technological Journal, Nov. 3, 2015, pp. 313-319.
L. Ding et al., "Nonionic hydrogels by copolymerization of vinylene carbonate and oligo(ethylene glycol) vinyl ethers", Polymer, Sep. 19, 2000, pp. 2745-2753.
"Search Report of Europe Counterpart Application", dated Jan. 28, 2021, p. 1-p. 10.

* cited by examiner

*Primary Examiner* — Maria Laios
*Assistant Examiner* — Angela J Martin
(74) *Attorney, Agent, or Firm* — JCIPRNET

(57) ABSTRACT

Provided are a binder aqueous solution for a lithium-ion battery electrode, a slurry for a lithium-ion battery electrode, a lithium-ion battery electrode, and a lithium-ion battery. The binder aqueous solution for a lithium-ion battery electrode contains a water-soluble polymer (A). The water-soluble polymer (A) is a polymer of a monomer group containing, with respect to 100 mol % of the monomer group, 5 mol % to 80 mol % of a hydroxyl group-containing vinyl ether (a). In one embodiment, the monomer group contains 20 mol % to 95 mol % of a (meth)acrylamide group-containing compound (b).

6 Claims, No Drawings

BINDER AQUEOUS SOLUTION FOR LITHIUM-ION BATTERY ELECTRODE, SLURRY FOR LITHIUM-ION BATTERY ELECTRODE, LITHIUM-ION BATTERY ELECTRODE, AND LITHIUM-ION BATTERY

CROSS-REFERENCE TO RELATED APPLICATION

This application claims the priority benefit of Japan Application No. 2019-161654, filed on Sep. 5, 2019. The entirety of the above-mentioned patent application is hereby incorporated by reference herein and made a part of this specification.

BACKGROUND

Technical Field

The disclosure relates to a binder aqueous solution for a lithium-ion battery electrode, a slurry for a lithium-ion battery electrode, a lithium-ion battery electrode, and a lithium-ion battery.

Related Art

Lithium-ion batteries have a small size, light weight and high energy density, and further, are repeatedly chargeable and dischargeable, and are used in a wide range of applications. Hence, in recent years, improvements to battery members such as electrodes have been studied with the aim of improving the performance of lithium-ion batteries.

The positive electrode and negative electrode of a lithium-ion battery are both produced in the following manner. A slurry prepared by dispersing an electrode active material and a binder resin in a solvent is applied on both sides of a current collector (for example, a metal foil), and after the solvent is dried and removed to form an electrode layer, the resultant is compression-molded by a roll press machine or the like.

In recent years, in an electrode for a lithium-ion battery, various electrode active materials have been proposed from the viewpoint of increasing battery capacity. However, depending on the electrode active material, the electrode for a lithium-ion battery is likely to expand and contract with charging and discharging. Hence, the electrode for a lithium-ion battery that is likely to expand and contract with charging and discharging undergoes a volume change (springback) from the initial stage of repetition of charging and discharging, and a lithium-ion battery using the above electrode is likely to deteriorate in electrical characteristics such as cycle characteristics.

Therefore, in this field, studies have been made to solve the above problem by binder resins. For example, it has been proposed that good charge and discharge characteristics can be obtained by using polyacrylamide (Patent Documents 1 and 2) as a binder of a water-soluble resin. In addition, with respect to expansion and contraction of an active material associated with charging and discharging, it has been proposed to suppress the expansion by adding a crosslinker to a particulate resin being a binder resin (Patent Document 3). The crosslinker usually causes a crosslinking reaction in the drying step after the slurry composition is applied to the current collector, and forms crosslinks between particles of the particulate resin or the like.

PATENT DOCUMENTS

[Patent Document 1] Japanese Patent Laid-open No. 2015-118908 [Patent Document 2] Japanese Patent Laid-open No. 2015-106488

[Patent Document 3] WO 2015/098507

However, from the viewpoint of ensuring solubility in water, the polyacrylamide of Patent Documents 1 and 2 cannot have such a high molecular weight that the binder resin does not dissolve in water. As a result, there is a problem that the resistance to springback arising from expansion of the active material is not sufficient.

Regarding the use in combination with the crosslinker as described in Patent Document 3, in some cases, even if a large amount of the crosslinker is added, its effect may not be exhibited. In such cases, when a large amount of the crosslinker is added in order to exhibit the effect of the crosslinker, for example, the springback resistance, adhesion of the electrode active material layer to the current collector may instead deteriorate, and desired effects such as high temperature cycle characteristics may not be obtained. Therefore, there is room for further improvement.

When a polymer containing an unsaturated organic acid has a low neutralization ratio, initial Coulombic efficiency and capacity retention rate may be lowered. When a polymer containing an acrylic ester and an unsaturated organic acid has a neutralization ratio of more than 95%, the amount of unneutralized unsaturated organic acid increases due to hydrolysis of the acrylic ester. Accordingly, the initial Coulombic efficiency and the capacity retention rate are lowered.

Therefore, problems to be solved by the disclosure include to provide a binder aqueous solution for a lithium-ion battery electrode, the binder aqueous solution imparting good initial Coulombic efficiency, capacity retention rate and springback resistance to a lithium-ion battery, good curling resistance, electrode flexibility and electrode adhesion to an electrode, and good storage stability to a slurry.

As a result of intensive studies, the inventors have found that the above problems can be solved by a water-soluble polymer containing a predetermined unsaturated monomer as a component.

SUMMARY

According to the disclosure, the following items are provided.

(Item 1)

A binder aqueous solution for a lithium-ion battery electrode, containing: a water-soluble polymer (A), the water-soluble polymer (A) being a polymer of a monomer group containing, with respect to 100 mol % of the monomer group, 5 mol % to 80 mol % of a hydroxyl group-containing vinyl ether (a).

(Item 2)

The binder aqueous solution for a lithium-ion battery electrode as described in the above Item, in which the monomer group contains 20 mol % to 95 mol % of a (meth)acrylamide group-containing compound (b).

(Item 3)

The binder aqueous solution for a lithium-ion battery electrode as described in any one of the above Items, in which the monomer group contains 0.01 mol % to 50 mol % of an unsaturated organic acid or an inorganic salt thereof (c).

(Item 4)

A slurry for a lithium-ion battery electrode, containing the binder aqueous solution for a lithium-ion battery electrode as described in any one of the above Items and an electrode active material (B).

(Item 5)

A lithium-ion battery electrode, obtained by applying the slurry for a lithium-ion battery electrode as described in the above Item to a current collector, and drying and curing the slurry.

(Item 6)

A lithium-ion battery including the lithium-ion battery electrode as described in the above Item.

In the disclosure, one or more of the features described above may be provided in combination in addition to the specified combinations.

By using the binder aqueous solution for a lithium-ion battery electrode of the disclosure, it is possible to prepare a slurry having good storage stability, produce an electrode that does not curl, has high adhesion and exhibits flexibility, and produce a lithium-ion battery having good initial Coulombic efficiency, capacity retention rate and springback resistance.

DESCRIPTION OF THE EMBODIMENTS

Throughout the disclosure, ranges of numerical values such as physical property values and content may be suitably set (for example, selected from the upper and lower limit values described in each item below). Specifically, regarding a numerical value α, when the upper limit and lower limit of the numerical value α are, for example, A4, A3, A2, and A1 (in which A4>A3>A2>A1), the numerical value a is in a range of, for example, A4 or less, A3 or less, A2 or less, A1 or more, A2 or more, A3 or more, A1 to A2, A1 to A3, A1 to A4, A2 to A3, A2 to A4, and A3 to A4.

[Binder Aqueous Solution for Lithium-Ion Battery Electrode: Also Referred to as Aqueous Solution]

The disclosure provides a binder aqueous solution for a lithium-ion battery electrode, containing a water-soluble polymer (A). The water-soluble polymer (A) is a polymer of a monomer group containing, with respect to 100 mol % of the monomer group, 5 mol % to 80 mol % of a hydroxyl group-containing vinyl ether (a).

<Water-Soluble Polymer (A): Also Referred to as Component (A)>

In the disclosure, "water-soluble" means having an insoluble content of less than 0.5% by mass (less than 2.5 mg) when 0.5 g of a compound thereof is dissolved in 100 g of water at 25° C.

<Hydroxyl Group-Containing Vinyl Ether (a): Also Referred to as Component (a)>

In the disclosure, a hydroxyl group-containing vinyl ether means a compound represented by the following formula:

$$H_2C{=}CH{-}O{-}R^{OH}$$

(In the formula, $R^{OH}$ means a group having a hydroxyl group.)

In one embodiment, the hydroxyl-containing vinyl ether is represented by general formula (1):

$$H_2C{=}CH{-}O{-}R^{OH} \quad (1)$$

(In the formula (1), R represents a substituted or unsubstituted oxyalkylene group having 1 to 5 carbon atoms, a polyoxyalkylene group represented by general formula (2):

(2)

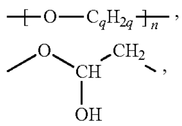

or a combination thereof.)

(In the formula (2), q is an integer of 1 to 3, and n is an integer of 1 or more; moreover, n is preferably an integer of 1 to 10.)

Examples of the alkylene group include linear alkylene group, branched alkylene group, and cycloalkylene group.

The linear alkylene group can be expressed by a general formula of $-(CH_2)_n-$ (in which n is an integer of 1 or more). Examples of the linear alkylene group include methylene group, ethylene group, propylene group, n-butylene group, and n-pentylene group.

The branched alkylene group is a group in which at least one hydrogen of a linear alkylene group is substituted with an alkyl group. Examples of the branched alkylene group include methylmethylene group, ethylmethylene group, propylmethylene group, butylmethylene group, methylethylene group, ethylethylene group, propylethylene group, methylpropylene group, 2-ethylpropylene group, dimethylpropylene group, and methylbutylene group.

Examples of the cycloalkylene group include monocyclic cycloalkylene group, crosslinked cyclic cycloalkylene group, and condensed cyclic cycloalkylene group.

In the disclosure, "monocyclic" means having a cyclic structure formed by covalent bonding of carbons and without crosslinking structure therein. "Condensed cyclic" means having a cyclic structure in which two or more single rings share two atoms (that is, only one side of each ring is shared (condensed) with each other). "Crosslinked cyclic" means having a cyclic structure in which two or more single rings share three or more atoms.

Examples of the monocyclic cycloalkylene group include cyclopentylene group.

Examples of a substituent of the oxyalkylene group include hydroxy group, amino group, acetyl group, and sulfonic acid group.

Examples of the hydroxyl group-containing vinyl ether include hydroxyalkyl vinyl ether and polyalkylene glycol monovinyl ether.

Examples of the hydroxyalkyl vinyl ether include hydroxy linear alkyl vinyl ether, hydroxy branched alkyl vinyl ether, and hydroxycycloalkyl vinyl ether.

Examples of the hydroxy linear alkyl vinyl ether include 2-hydroxyethyl vinyl ether, 3-hydroxypropyl vinyl ether, 4-hydroxybutyl vinyl ether, and 5-hydroxypentyl vinyl ether.

Examples of the hydroxy branched alkyl vinyl ether include 2-hydroxypropyl vinyl ether, 2-hydroxy-2-methylpropyl vinyl ether, and 4-hydroxy-2-methylbutyl vinyl ether.

Examples of the hydroxycycloalkyl vinyl ether include 4-hydroxycyclopentyl vinyl ether.

Examples of the polyalkylene glycol monovinyl ether include polymethylene glycol monovinyl ether, polyethylene glycol monovinyl ether, and polypropylene glycol monovinyl ether.

Examples of the polymethylene glycol monovinyl ether include dimethylene glycol monovinyl ether, trimethylene glycol monovinyl ether, tetramethylene glycol monovinyl ether, pentamethylene glycol monovinyl ether, hexamethylene glycol monovinyl ether, heptamethylene glycol monovinyl ether, octamethylene glycol monovinyl ether, nonamethylene glycol monovinyl ether, and decamethylene glycol monovinyl ether.

Examples of the polyethylene glycol monovinyl ether include diethylene glycol monovinyl ether, triethylene glycol monovinyl ether, tetraethylene glycol monovinyl ether, pentaethylene glycol monovinyl ether, hexaethylene glycol monovinyl ether, heptaethylene glycol monovinyl ether, octaethylene glycol monovinyl ether, nonaethylene glycol monovinyl ether, and decaethylene glycol monovinyl ether.

Examples of the polypropylene glycol monovinyl ether include dipropylene glycol monovinyl ether, tripropylene glycol monovinyl ether, tetrapropylene glycol monovinyl ether, pentapropylene glycol monovinyl ether, hexapropylene glycol monovinyl ether, heptapropylene glycol monovinyl ether, octapropylene glycol monovinyl ether, nonapropylene glycol monovinyl ether, and decapropylene glycol monovinyl ether.

The upper limit and lower limit of the content of the hydroxyl group-containing vinyl ether with respect to 100 mol % of the monomer group are, for example, 80 mol %, 75 mol %, 70 mol %, 65 mol %, 60 mol %, 55 mol %, 50 mol %, 45 mol %, 40 mol %, 35 mol %, 30 mol %, 25 mol %, 20 mol %, 15 mol %, 10 mol %, 9 mol %, and 5 mol %. In one embodiment, the content of the hydroxyl group-containing vinyl ether with respect to 100 mol % of the monomer group is 5 mol % to 80 mol %.

The upper limit and lower limit of the content of the hydroxyl group-containing vinyl ether with respect to 100% by mass of the monomer group are, for example, 85% by mass, 80% by mass, 75% by mass, 70% by mass, 65% by mass, 60% by mass, 55% by mass, 50% by mass, 45% by mass, 40% by mass, 35% by mass, 30% by mass, 25% by mass, 20% by mass, 15% by mass, 10% by mass, and 5% by mass. In one embodiment, the content of the hydroxyl group-containing vinyl ether with respect to 100% by mass of the monomer group is 5% by mass to 85% by mass.

<(Meth)Acrylamide Group-Containing Compound (b): Also Referred to as Component (b)>

In the disclosure, "(meth)acrylamide group-containing compound" means a compound having a (meth)acrylamide group. As the (meth)acrylamide group-containing compound, various known ones may be used without particular limitation, and may be used singly or in combination of two or more.

In the disclosure, "(meth)acryl" means "at least one selected from the group consisting of acryl and methacryl." Similarly, "(meth)acrylate" means "at least one selected from the group consisting of acrylate and methacrylate." "(Meth)acryloyl" means "at least one selected from the group consisting of acryloyl and methacryloyl."

In one embodiment, the (meth)acrylamide group-containing compound is expressed by the following structural formula:

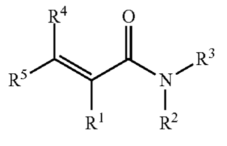

(In the formula, $R^1$ is a hydrogen atom or a methyl group; $R^2$ and $R^3$ are each independently a hydrogen atom, a substituted or unsubstituted alkyl group, or an acetyl group, or a group in which $R^2$ and $R^3$ form a ring structure together; $R^4$ and $R^5$ are each independently a hydrogen atom, a substituted or unsubstituted alkyl group, a hydroxy group, an amino group ($-NR^aR^b$ (in which Ra and $R^b$ are each independently a hydrogen atom or a substituted or unsubstituted alkyl group), or an acetyl group. Examples of a substituent of the substituted alkyl group include hydroxy group, amino group, and acetyl group. In addition, examples of the group in which $R^2$ and $R^3$ form a ring structure together include morpholyl group.)

Examples of the alkyl group include linear alkyl group, branched alkyl group, and cycloalkyl group.

The linear alkyl group is expressed by a general formula of $-C_nH_{2+}1$ (in which n is an integer of 1 or more). Examples of the linear alkyl group include methyl group, ethyl group, propyl group, n-butyl group, n-pentyl group, n-hexyl group, n-heptyl group, n-octyl group, n-nonyl group, and n-decamethyl group.

The branched alkyl group is a group in which at least one hydrogen atom of a linear alkyl group is substituted with an alkyl group. Examples of the branched alkyl group include i-propyl group, i-butyl group, s-butyl group, t-butyl group, diethylpentyl group, trimethylbutyl group, trimethylpentyl group, and trimethylhexyl group.

Examples of the cycloalkyl group include monocyclic cycloalkyl group, crosslinked cyclic cycloalkyl group, and condensed cyclic cycloalkyl group.

Examples of the monocyclic cycloalkyl group include cyclopentyl group, cyclohexyl group, cycloheptyl group, cyclodecyl group, and 3,5,5-trimethylcyclohexyl group.

Examples of the crosslinked cyclic cycloalkyl group include tricyclodecyl group, adamantyl group, and norbornyl group.

Examples of the condensed cyclic cycloalkyl group include bicyclodecyl group.

The number of carbon atoms of the alkyl group is not particularly limited, and its upper limit and lower limit are, for example, 40, 35, 30, 29, 25, 20, 15, 12, 10, 9, 8, 7, 6, 5, 4, 3, 2, and 1.

Examples of the above (meth)acrylamide group-containing compound include (meth)acrylamide, N-isopropyl (meth)acrylamide, N,N-dimethyl(meth)acrylamide, N,N-diethyl(meth)acrylamide, N,N-dimethylaminopropyl(meth) acrylamide, N-methylol(meth)acrylamide, diacetone(meth) acrylamide, maleic acid amide, (meth)acryloylmorpholine, hydroxyethyl(meth)acrylamide, and a salt thereof. Examples of the above salt include dimethylaminopropyl(meth)acrylamide methyl chloride quaternary salt, and dimethylaminoethyl (meth)acrylate benzyl chloride quaternary salt. Among them, when (meth)acrylamide especially acrylamide is used, a binder can be prepared which has high water solubility, has a high interaction with an electrode active material, and improves dispersibility of a slurry or a binding property between electrode active materials inside an electrode.

The upper limit and lower limit of the content of the (meth)acrylamide group-containing compound with respect to 100 mol % of the monomer group are, for example, 95 mol %, 90 mol %, 85 mol %, 80 mol %, 75 mol %, 70 mol %, 65 mol %, 60 mol %, 55 mol %, 50 mol %, 45 mol %, 40 mol %, 35 mol %, 30 mol %, 25 mol %, and 20 mol %. In one embodiment, the above content preferably ranges from 20 mol % to 95 mol %.

The upper limit and lower limit of the content of the (meth)acrylamide group-containing compound with respect to 100% by mass of the monomer group are, for example, 95% by mass, 90% by mass, 85% by mass, 80% by mass, 75% by mass, 70% by mass, 65% by mass, 60% by mass, 55% by mass, 50% by mass, 45% by mass, 40% by mass, 35% by mass, 30% by mass, 25% by mass, 20% by mass, 15% by mass, and 10% by mass. In one embodiment, the content of the (meth)acrylamide group-containing compound with respect to 100% by mass of the monomer group is preferably 10% by mass to 95% by mass.

<Unsaturated Organic Acid or Inorganic Salt Thereof (c): Also Referred to as Component (c)>

As the component (c), various known ones may be used without particular limitation, and may be used singly or in combination of two or more.

Examples of the unsaturated organic acid include unsaturated carboxylic acid, unsaturated sulfonic acid, and unsaturated phosphoric acid.

Examples of the unsaturated carboxylic acid include (meth)acrylic acid, crotonic acid, maleic acid, fumaric acid, and itaconic acid.

Examples of the unsaturated sulfonic acid include: α,β-ethylenically unsaturated sulfonic acid, such as vinylsulfonic acid, styrenesulfonic acid, and (meth)allylsulfonic acid; (meth)acrylamide t-butylsulfonic acid, 2-(meth)acrylamide-2-methylpropanesulfonic acid, 2-(meth)acrylamide-2-hydroxypropanesulfonic acid, 3-sulfopropane(meth)acrylic ester, and bis-(3-sulfopropyl)itaconic ester.

Examples of the unsaturated phosphoric acid include vinylphosphonic acid, vinyl phosphate, bis((meth)acryloxyethyl) phosphate, diphenyl-2-(meth)acryloyloxyethyl phosphate, dibutyl-2-(meth)acryloyloxyethyl phosphate, dioctyl-2-(meth)acryloyloxyethyl phosphate, monomethyl-2-(meth)acryloyloxyethyl phosphate, and 3-(meth)acryloxy-2-hydroxypropanephosphoric acid.

In the disclosure, a compound corresponding to both a (meth)acrylamide group-containing compound and an unsaturated organic acid is regarded as an unsaturated organic acid.

In the disclosure, an inorganic salt of an unsaturated organic acid refers to a salt whose cationic portion is a metal cation. Examples of the inorganic salt include alkali metal salt and alkaline earth metal salt.

Examples of the alkali metal include lithium, sodium, and potassium.

Examples of the alkaline earth metal include magnesium and calcium.

The upper limit and lower limit of the content of the unsaturated organic acid or an inorganic salt thereof with respect to 100 mol % of the monomer group are, for example, 50 mol %, 45 mol %, 40 mol %, 35 mol %, 30 mol %, 25 mol %, 20 mol %, 15 mol %, 10 mol %, 9 mol %, 5 mol %, 4 mol %, 1 mol %, 0.9 mol %, 0.5 mol %, 0.3 mol %, 0.1 mol %, 0.09 mol %, 0.05 mol %, 0.03 mol %, and 0.01 mol %. In one embodiment, the content of the unsaturated organic acid or an inorganic salt thereof with respect to 100 mol % of the monomer group is preferably 0.01 mol % to 50 mol %.

The upper limit and lower limit of the content of the unsaturated organic acid or an inorganic salt thereof with respect to 100% by mass of the monomer group are, for example, 75% by mass, 70% by mass, 65% by mass, 60% by mass, 55% by mass, 50% by mass, 45% by mass, 40% by mass, 35% by mass, 30% by mass, 25% by mass, 20% by mass, 15% by mass, 10% by mass, 9% by mass, 5% by mass, 4% by mass, 1% by mass, 0.9% by mass, 0.5% by mass, 0.3% by mass, 0.1% by mass, 0.09% by mass, 0.05% by mass, 0.03% by mass, and 0.01% by mass. In one embodiment, the content of the unsaturated organic acid or an inorganic salt thereof with respect to 100% by mass of the monomer group is preferably 0.01% by mass to 75% by mass.

The upper limit and lower limit of the content of the unsaturated carboxylic acid or an inorganic salt thereof with respect to 100 mol % of the monomer group are, for example, 50 mol %, 45 mol %, 40 mol %, 35 mol %, 30 mol %, 25 mol %, 20 mol %, 15 mol %, 10 mol %, 5 mol %, 1 mol %, and 0 mol %. In one embodiment, the content of the unsaturated carboxylic acid or an inorganic salt thereof with respect to 100 mol % of the monomer group is preferably 0 mol % to 50 mol %.

The upper limit and lower limit of the content of the unsaturated carboxylic acid or an inorganic salt thereof with respect to 100% by mass of the monomer group are, for example, 60% by mass, 55% by mass, 50% by mass, 45% by mass, 40% by mass, 35% by mass, 30% by mass, 25% by mass, 20% by mass, 15% by mass, 10% by mass, 5% by mass, 1% by mass, and 0% by mass. In one embodiment, the content of the unsaturated carboxylic acid or an inorganic salt thereof with respect to 100% by mass of the monomer group is preferably 0% by mass to 60% by mass.

The upper limit and lower limit of the content of the unsaturated sulfonic acid or an inorganic salt thereof with respect to 100 mol % of the monomer group are, for example, 50 mol %, 45 mol %, 40 mol %, 35 mol %, 30 mol %, 25 mol %, 20 mol %, 15 mol %, 10 mol %, 5 mol %, 1 mol %, and 0 mol %. In one embodiment, the content of the unsaturated sulfonic acid or an inorganic salt thereof with respect to 100 mol % of the monomer group is preferably 0 mol % to 50 mol %.

The upper limit and lower limit of the content of the unsaturated sulfonic acid or an inorganic salt thereof with respect to 100% by mass of the monomer group are, for example, 75% by mass, 70% by mass, 65% by mass, 60% by mass, 55% by mass, 50% by mass, 45% by mass, 40% by mass, 35% by mass, 30% by mass, 25% by mass, 20% by mass, 15% by mass, 10% by mass, 5% by mass, 1% by mass, and 0% by mass. In one embodiment, the content of the unsaturated sulfonic acid or an inorganic salt thereof with respect to 100% by mass of the monomer group is preferably 0% by mass to 75% by mass.

The upper limit and lower limit of the content of the unsaturated phosphoric acid or an inorganic salt thereof with respect to 100 mol % of the monomer group are, for example, 50 mol %, 45 mol %, 40 mol %, 35 mol %, 30 mol %, 25 mol %, 20 mol %, 15 mol %, 10 mol %, 5 mol %, 1 mol %, and 0 mol %. In one embodiment, the content of the unsaturated phosphoric acid or an inorganic salt thereof with respect to 100 mol % of the monomer group is preferably 0 mol % to 50 mol %.

The upper limit and lower limit of the content of the unsaturated phosphoric acid or an inorganic salt thereof with respect to 100% by mass of the monomer group are, for example, 75% by mass, 70% by mass, 65% by mass, 60% by mass, 55% by mass, 50% by mass, 45% by mass, 40% by mass, 35% by mass, 30% by mass, 25% by mass, 20% by mass, 15% by mass, 10% by mass, 5% by mass, 1% by mass, and 0% by mass. In one embodiment, the content of the unsaturated phosphoric acid or an inorganic salt thereof with respect to 100% by mass of the monomer group is preferably 0% by mass to 75% by mass.

<Relative Ratio Between Amounts of Components (a) to (c) in Monomer Group>

The upper limit and lower limit of a molar ratio [amount of substance of component (a)/amount of substance of component (b)] between the component (a) and the component (b) contained in the monomer group are, for example, 4, 3, 2, 1, 0.9, 0.7, 0.5, 0.3, 0.1, 0.09, 0.07, and 0.05. In one embodiment, the molar ratio [amount of substance of component (a)/amount of substance of component (b)] between the component (a) and the component (b) contained in the monomer group is preferably 0.05 to 4.

The upper limit and lower limit of a molar ratio [amount of substance of component (a)/amount of substance of component (c)] between the component (a) and the component (c) contained in the monomer group are, for example, 8,000, 7,500, 5,000, 2,500, 1,000, 750, 500, 250, 100, 90, 75, 50, 25, 10, 9, 7, 5, 3, 1, 0.9, 0.7, 0.5, 0.3, and 0.1. In one embodiment, the molar ratio [amount of substance of component (a)/amount of substance of component (c)] between the component (a) and the component (c) contained in the monomer group is preferably 0.1 to 8,000.

The upper limit and lower limit of a molar ratio [amount of substance of component (b)/amount of substance of component (c)] between the component (b) and the component (c) contained in the monomer group are, for example, 9,500, 9,000, 8,000, 7,500, 5,000, 2,500, 1,000, 750, 500, 250, 100, 90, 75, 50, 25, 10, 9, 7, 5, 3, 1, 0.9, 0.7, 0.5, and 0.4. In one embodiment, the molar ratio [amount of substance of component (b)/amount of substance of component (c)] between the component (b) and the component (c) contained in the monomer group is preferably 0.4 to 9,500.

The upper limit and lower limit of a mass ratio [mass of component (a)/mass of component (b)] between the component (a) and the component (b) contained in the monomer group are, for example, 8.5, 8, 7.5, 5, 3, 1, 0.9, 0.5, 0.3, 0.1, 0.09, and 0.06. In one embodiment, the mass ratio [mass of component (a)/mass of component (b)] between the component (a) and the component (b) contained in the monomer group is preferably 0.06 to 8.5.

The upper limit and lower limit of a mass ratio [mass of component (a)/mass of component (c)] between the component (a) and the component (c) contained in the monomer group are, for example, 8,500, 8,000, 7,500, 5,000, 2,500, 1,000, 750, 500, 250, 100, 90, 75, 50, 25, 10, 9, 7, 5, 3, 1, 0.9, 0.7, 0.5, 0.3, 0.1, 0.09, and 0.06. In one embodiment, the mass ratio [mass of component (a)/mass of component (c)] between the component (a) and the component (c) contained in the monomer group is preferably 0.06 to 8,500.

The upper limit and lower limit of a mass ratio [mass of component (b)/mass of component (c)] between the component (b) and the component (c) contained in the monomer group are, for example, 8,000, 7,500, 5,000, 2,500, 1,000, 750, 500, 250, 100, 90, 75, 50, 25, 10, 9, 7, 5, 3, 1, 0.9, 0.7, 0.5, 0.3, and 0.13. In one embodiment, the mass ratio [mass of component (b)/mass of component (c)] between the component (b) and the component (c) contained in the monomer group is preferably 0.13 to 8,000.

<Monomers Corresponding to None of Above: Also Referred to as Other Components>

In the above monomer group, monomers (other components) that correspond to none of the components (a) to (c) may be used as long as the desired effects of the disclosure are not impaired. As the other components, various known ones may be used singly or in combination of two or more.

Examples of the other components include a hydroxyl group-free unsaturated carboxylic ester, a conjugated diene, and an aromatic vinyl compound.

The hydroxyl group-free unsaturated carboxylic ester is preferably a hydroxyl group-free (meth)acrylic ester. Examples of the hydroxyl group-free (meth)acrylic ester include a hydroxyl group-free linear (meth)acrylic ester, a hydroxyl group-free branched (meth)acrylic ester, a hydroxyl group-free alicyclic (meth)acrylic ester, and a hydroxyl group-free substituted (meth)acrylic ester.

Examples of the hydroxyl group-free linear (meth)acrylic ester include methyl (meth)acrylate, ethyl (meth)acrylate, n-propyl (meth)acrylate, n-butyl (meth)acrylate, n-amyl (meth)acrylate, hexyl (meth)acrylate, n-octyl (meth)acrylate, nonyl (meth)acrylate, and decyl (meth)acrylate.

Examples of the hydroxyl group-free branched (meth) acrylic ester include i-propyl (meth)acrylate, i-butyl (meth) acrylate, i-amyl (meth)acrylate, and 2-ethylhexyl (meth) acrylate.

Examples of the hydroxyl group-free alicyclic (meth) acrylic ester include cyclohexyl (meth)acrylate.

Examples of the hydroxyl group-free substituted (meth) acrylic ester include glycidyl (meth)acrylate, allyl (meth) acrylate, and ethylene di(meth)acrylate.

The hydroxyl group-free unsaturated carboxylic ester can be suitably used for the purpose of imparting flexibility to an electrode. From the above viewpoint, the content of the hydroxyl group-free unsaturated carboxylic ester with respect to 100 mol % of the above monomer group is preferably less than 40 mol % (for example, less than 30 mol %, less than 20 mol %, less than 19 mol %, less than 15 mol %, less than 10 mol %, less than 5 mol %, less than 1 mol %, or 0 mol %).

In addition, the content of the hydroxyl group-free unsaturated carboxylic ester with respect to 100% by mass of the above monomer group is preferably 90% by mass or less (for example, less than 80% by mass, less than 70% by mass, less than 60% by mass, less than 50% by mass, less than 40% by mass, less than 30% by mass, less than 20% by mass, less than 19% by mass, less than 15% by mass, less than 10% by mass, less than 5% by mass, less than 1% by mass, or 0% by mass).

Examples of the conjugated diene include 1,3-butadiene, 2-methyl-1,3-butadiene, 2,3-dimethyl-1,3-butadiene, 2-chloro-1,3-butadiene, a substituted linear conjugated pentadiene, and a substituted and side chain conjugated hexadiene.

From the viewpoint of cycle characteristics of the lithium-ion battery, the content of the conjugated diene with respect to 100 mol % of the above monomer group is preferably less than 10 mol %, more preferably 0 mol %.

The upper limit and lower limit of the content of the conjugated diene with respect to 100% by mass of the above monomer group are, for example, 30% by mass, 20% by mass, 10% by mass, 5% by mass, 1% by mass, and 0% by mass. In one embodiment, the above content is preferably 0% by mass to 30% by mass.

In addition, examples of the aromatic vinyl compound include styrene, α-methylstyrene, p-methylstyrene, vinyltoluene, chlorostyrene, and divinylbenzene.

From the viewpoint of cycle characteristics of the lithium-ion battery, the content of the aromatic vinyl compound with respect to 100 mol % of the above monomer group is preferably less than 10 mol %, more preferably 0 mol %.

The upper limit and lower limit of the content of the aromatic vinyl compound with respect to 100% by mass of the above monomer group are, for example, 30% by mass, 20% by mass, 10% by mass, 5% by mass, 1% by mass, and 0% by mass. In one embodiment, the above content is preferably 0% by mass to 30% by mass.

A ratio of the other components than the hydroxyl group-free unsaturated carboxylic ester, the conjugated diene and the aromatic vinyl compound mentioned above in the above monomer group is, for example, less than 10 mol %, less than 5 mol %, less than 2 mol %, less than 1 mol %, less than 0.1 mol %, less than 0.01 mol %, or 0 mol %, with respect to 100 mol % of the above monomer group. In addition, with respect to 100% by mass of the above monomer group, the ratio of the other components is, for example, less than 10% by mass, less than 9% by mass, less than 7% by mass, less than 5% by mass, less than 4% by mass, less than 2% by mass, less than 1% by mass, less than 0.9% by mass, less than 0.5% by mass, less than 0.3% by mass, less than 0.1% by mass, less than 0.05% by mass, less than 0.01% by mass, or 0% by mass.

<Method for Preparing Component (A)>

The component (A) may be synthesized by various known polymerization methods, preferably a radical polymerization method. Specifically, it is preferable to add a radical polymerization initiator and, if necessary, a chain transfer agent, to a monomer mixture containing the aforementioned components, and, while stirring the mixture, perform a polymerization reaction at a reaction temperature of 50° C. to 100° C. The reaction time is not particularly limited and is preferably 1 hour to 10 hours.

As the radical polymerization initiator, various known ones may be used without particular limitation. Examples of the radical polymerization initiator include: a persulfate, such as potassium persulfate and ammonium persulfate; a redox polymerization initiator in which the above persulfate and a reductant such as sodium bisulfite are combined; and an azo initiator, such as 2,2'-azobis-2-amidinopropane dihydrochloride. The amount of the radical polymerization initiator used is not particularly limited, and is preferably 0.05% by mass to 5.0% by mass, more preferably 0.1% by mass to 3.0% by mass, with respect to 100% by mass of the monomer group that provides the component (A).

Before the radical polymerization reaction and/or when the obtained component (A) is dissolved in water, for the purpose of improving production stability, the pH of a reaction solution may be adjusted by a general neutralizer such as ammonia or organic amine, potassium hydroxide, sodium hydroxide, and lithium hydroxide. In this case, the pH is preferably 2 to 11. For the same purpose, it is also possible to use ethylene diamine tetraacetic acid (EDTA), which is a metal ion sealant, or a salt thereof, or the like.

If the component (A) has an acid group, it can be used by a neutralization ratio thereof being appropriately adjusted (a neutralization ratio of 100% indicating that neutralization is performed by an alkali having the same number of moles as the acid component contained in the component (A); a neutralization ratio of 50% indicating that neutralization is performed by an alkali having half the number of moles of the acid component contained in the component (A)) depending on the use. The neutralization ratio when the electrode active material is dispersed is not particularly limited. In one embodiment, the neutralization ratio is preferably 95% to 100% after formation of a coating layer or the like. 95% or more is preferable from the viewpoint of preventing a decrease in initial capacity, and 100% or less is preferable from the viewpoint of preventing hydrolysis. Examples of a neutralized salt include Li salt, Na salt, K salt, ammonium salt, Mg salt, Ca salt, Zn salt, and A1 salt.

In one embodiment, the component (A) is preferably an inorganic salt. The inorganic salt as the component (A) refers to a salt whose cationic portion is a metal cation. Examples of the inorganic salt include those mentioned above.

<Physical Properties of Component (A)>

The upper limit and lower limit of a glass transition temperature of the component (A) are, for example, 160° C., 155° C., 150° C., 145° C., 140° C., 135° C., 130° C., 125° C., 120° C., 115° C., 110° C., 105° C., 100° C., 95° C., 90° C., 85° C., 80° C., 75° C., 70° C., 65° C., 60° C., 55° C., 50° C., 45° C., 40° C., 35° C., 30° C., 25° C., 20° C., 15° C., 10° C., 5° C., and 0° C. In one embodiment, 0° C. or higher is preferable, and 30° C. or higher is more preferable from the viewpoints of mechanical strength and heat resistance.

The glass transition temperature of the component (A) may be adjusted by a combination of monomers. The glass transition temperature of the component (A) can be calculated from glass transition temperatures (Tg) (absolute temperature: K) of homopolymers of the monomers and mass fractions thereof based on the Fox equation shown below.

$$1/Tg=(W_1/Tg_1)+(W_2/Tg_2)+(W_3/Tg_3)+ \ldots +(W_n/Tg_n)$$

[In the equation, Tg indicates the glass transition temperature (K) of the polymer to be calculated, $W_1$ to $W_n$ each indicate a mass fraction of each monomer, and $Tg_1$ to $Tg_n$ each indicate the glass transition temperature (K) of a homopolymer of each monomer.]

For example, the glass transition temperature is 165° C. in the case of a homopolymer of acrylamide, is 106° C. in the case of a homopolymer of acrylic acid, is −15° C. in the case of a homopolymer of hydroxyethyl acrylate, and is 105° C. in the case of a homopolymer of acrylonitrile. In order to obtain the component (A) having a desired glass transition temperature, the monomer composition constituting the component (A) can be determined. Moreover, the glass transition temperature of a homopolymer of a monomer can be measured by a differential scanning calorimeter (DSC), a differential thermal analyzer (DTA), a thermomechanical measurement apparatus (TMA) or the like under the condition that the temperature is raised from −100° C. to 300° C. (at a temperature rising rate of 10° C./min). Moreover, values described in a literature may also be used. Examples of the literature include page 325 of “Handbook of Chemistry: Pure Chemistry II” (Revised 5th Edition) edited by the Chemical Society of Japan.

While a gel fraction of a cured product of the component (A) is not particularly limited, the upper limit and lower limit of the gel fraction of the cured product of the component (A) are, for example, 99.9%, 95%, 90%, 85%, 80%, 75%, 70%, 65%, 60%, 55%, 50%, 45%, 40%, 35%, 30%, 25%, and 20%. In one embodiment, 20% or more is preferable, and 25% or more is more preferable, from the viewpoint of the effect of exhibiting the springback resistance associated with a charge and discharge cycle.

Moreover, the gel fraction of the cured product of the component (A) is a value calculated by the following equation:

$$\text{Gel fraction}(\%)=\{\text{insoluble residue } (g) \text{ in water/mass } (g) \text{ of solid resin}\}\times 100$$

In one embodiment, curing conditions of the above cured product are, for example, 120° C. for 4 hours.

The above gel fraction is measured as follows, for example. A binder aqueous solution for a lithium-ion battery electrode in an appropriate amount (for example, 10 g), which contains the component (A), is put in an appropriate container (for example, an ointment can (product name “Ointment Can made of tinplate” made by SOGO LABORATORY GLASS WORKS CO., LTD.)), and after drying under appropriate drying conditions (for example, at 120° C. for 4 hours by a circulating air dryer (product name “Blower Constant Temperature Dryer DSR420DA” made by Advantec Toyo Kaisha, Ltd.)), a solid resin after thermal cross-linking is obtained. The mass of the solid resin is accurately measured at 25° C. by an appropriate mass meter (for example, "Standard Balance CPA324S" (product name) made by Sartorius Japan K.K.). The measured solid resin is transferred to an appropriate container (for example, a 300 mL beaker) containing pure water in an appropriate amount (for example, 150 mL), and after immersion in water under appropriate conditions (for example, at 25° C. for 3 hours) under stirring by an appropriate magnetic stirrer (for example, "Powerful Magnetic Stirrer RCX-1000D" (product name) made by Tokyo Rikakikai Co., Ltd.), the resultant is filtered under reduced pressure by an appropriate tool (for example, filter paper ("No. 50B" made by Kiriyama Glass Works Co.), and using a Kiriyama funnel (product name "KIRIYAMA ROHTO SB-60" made by Kiriyama Glass Works Co.) and a suction bell (product name "Suction Bell VKB-200" made by Kiriyama Glass Works Co.)). After that, an insoluble residue remaining on the filter paper is dried under appropriate conditions (for example, at 120° C. for 3 hours) by an appropriate dryer (for example, the above circulating air dryer), followed by an accurate measurement of the mass of the insoluble residue by an appropriate mass meter (for example, the above mass meter) at an appropriate temperature (for example, 25° C.), and a gel fraction of the resin after thermal crosslinking of the water-soluble binder for a battery is calculated from the above equation.

Thermal crosslinking of the component (A) is considered to be caused by a hydroxyl group derived from the hydroxyl group-containing (meth)acrylic ester (a) and an amide group derived from the (meth)acrylamide group-containing compound (b). A molar ratio (hydroxyl group/amide group) between the hydroxyl group and the amide group in the component (A) is not particularly limited, and the amide group is preferably in excess. The upper limit and lower limit of the molar ratio (hydroxyl group/amide group) between the hydroxyl group and the amide group are, for example, 2.0, 1.5, 1.0, 0.9, 0.7, 0.5, 0.3, 0.1, 0.09, 0.07, and 0.05. In one embodiment, the hydroxyl group to amide group molar ratio is preferably 0.05 to 2.0, more preferably 0.1 to 2.0. It is conceivable that the effect of exhibiting the springback resistance associated with a charge and discharge cycle can be achieved by satisfying the above without losing the adhesion of the active material layer to the current collector. However, the disclosure is not intended to be limited thereto.

A weight average molecular weight (Mw) of the component (A) is not particularly limited, and its upper limit and lower limit are, for example, 7,000,000, 6,500,000, 6,000,000, 5,500,000, 5,000,000, 4,500,000, 4,000,000, 3,500,000, 3,000,000, 2,500,000, 2,000,000, 1,500,000, 1,000,000, 950,000, 900,000, 850,000, 800,000, 750,000, 700,000, 650,000, 600,000, 550,000, 500,000, 450,000, 400,000, 350,000, 300,000, 250,000, 200,000, 150,000, and 100,000. In one embodiment, from the viewpoint of dispersion stability of the above slurry, 100,000 to 7,000,000 are preferable, and 350,000 to 6,000,000 are more preferable.

A number average molecular weight (Mn) of the component (A) is not particularly limited, and its upper limit and lower limit are, for example, 6,000,000, 5,500,000, 5,000,000, 4,500,000, 4,000,000, 3,500,000, 3,000,000, 2,500,000, 2,000,000, 1,500,000, 1,000,000, 950,000, 900,000, 850,000, 800,000, 750,000, 700,000, 650,000, 600,000, 550,000, 500,000, 450,000, 400,000, 300,000, 200,000, 100,000, 50,000, and 10,000. In one embodiment, the number average molecular weight (Mn) of the component (A) is preferably 10,000 or more.

The weight average molecular weight and the number average molecular weight may be calculated, for example, as values in terms of polyacrylic acid as measured by gel permeation chromatography (GPC) in an appropriate solvent.

The upper limit and lower limit of a molecular weight distribution (Mw/Mn) of the component (A) are, for example, 15, 14, 13, 11, 10, 9, 7.5, 5, 4, 3, 2.9, 2.5, 2, 1.5, and 1.1. In one embodiment, the molecular weight distribution (Mw/Mn) of the component (A) is preferably 1.1 to 15.

B-type viscosity of an aqueous solution containing 13% by mass of the component (A) is not particularly limited, and its upper limit and lower limit are, for example, 100,000 mPa·s, 90,000 mPa·s, 80,000 mPa·s, 70,000 mPa·s, 60,000 mPa·s, 50,000 mPa·s, 45,000 mPa·s, 40,000 mPa·s, 30,000 mPa·s, 20,000 mPa·s, 10,000 mPa·s, 9,000 mPa·s, 8,000 mPa·s, 7,000 mPa·s, 6,000 mPa·s, 5,000 mPa·s, 4,000 mPa·s, 3,000 mPa·s, 2,000 mPa·s, 1,000 mPa·s, 900 mPa·s, 700 mPa·s, 500 mPa·s, 300 mPa·s, 200 mPa·s, and 100 mPa·s. In one embodiment, the above B-type viscosity preferably ranges from 100 mPa·s to 100,000 mPa·s.

The B-type viscosity is measured by a B-type viscometer such as "B-type Viscometer Model BM" (product name) made by Toki Sangyo Co., Ltd.

The upper limit and lower limit of the pH of the binder aqueous solution for a lithium-ion battery electrode are, for example, 9, 8.9, 8.5, 8, 7.9, 7.5, 7, 6.9, 6.5, 6, 5.9, 5.6, 5.5, 5.4, 5.2, 5.1, and 5. In one embodiment, the pH of the binder aqueous solution for a lithium-ion battery electrode is preferably 5 to 9 from the viewpoint of solution stability.

The pH may be measured at 25° C. using a glass electrode pH meter (for example, "Handy pH Meter D-52" (product name) made by Horiba, Ltd.).

The upper limit and lower limit of the content of the component (A) with respect to 100% by mass of the binder aqueous solution for a lithium-ion battery electrode are, for example, 25% by mass, 23% by mass, 21% by mass, 20% by mass, 19% by mass, 15% by mass, 14% by mass, 12% by mass, 10% by mass, 9% by mass, 7% by mass, 6% by mass, and 5% by mass. In one embodiment, the content of the component (A) with respect to 100% by mass of the binder aqueous solution for a lithium-ion battery electrode is preferably 5% by mass to 25% by mass.

The upper limit and lower limit of the content of water with respect to 100% by mass of the binder aqueous solution for a lithium-ion battery electrode are, for example, 95% by mass, 90% by mass, 85% by mass, and 80% by mass. In one embodiment, the content of the water with respect to 100% by mass of the binder aqueous solution for a lithium-ion battery electrode is preferably 80% by mass to 95% by mass.

The upper limit and lower limit of a mass ratio between the component (A) and the water contained in the binder aqueous solution for a lithium-ion battery electrode are, for example, 0.25, 0.2, 0.15, 0.1, and 0.05. In one embodiment, the mass ratio between the component (A) and the water contained in the binder aqueous solution for a lithium-ion battery electrode is preferably 0.05 to 0.25.

<Additive>

The binder aqueous solution for a lithium-ion battery electrode may contain, as an additive, a component that does not correspond to either the component (A) or water.

Examples of the additive include a dispersant, a leveling agent, an antioxidant, a thickener, and a dispersion (emulsion).

The content of the additive is, for example, 5% by mass or less, less than 5% by mass, less than 4% by mass, less than 2% by mass, less than 1% by mass, less than 0.9% by mass, less than 0.5% by mass, less than 0.4% by mass, less than 0.2% by mass, less than 0.1% by mass, less than 0.09% by mass, less than 0.05% by mass, less than 0.04% by mass, less than 0.02% by mass, less than 0.01% by mass, or 0% by mass, with respect to 100% by mass of the component (A). In one embodiment, the content of the additive is preferably 5% by mass or less with respect to 100% by mass of the component (A) from the viewpoint that haze is generated in the binder when the content exceeds 5% by mass.

In addition, the content of the additive with respect to 100% by mass of the above aqueous solution is, for example, less than 5% by mass, less than 4% by mass, less than 2% by mass, less than 1% by mass, less than 0.9% by mass, less than 0.5% by mass, less than 0.4% by mass, less than 0.2% by mass, less than 0.1% by mass, less than 0.09% by mass, less than 0.05% by mass, less than 0.04% by mass, less than 0.02% by mass, less than 0.01% by mass, or 0% by mass.

Examples of the dispersant include an anionic dispersant, a cationic dispersant, a nonionic dispersant, and a polymer dispersant.

Examples of the leveling agent include a surfactant, such as an alkyl-based surfactant, a silicon-based surfactant, a fluorine-based surfactant, and a metal-based surfactant. By using the surfactant, cissing that occurs during coating may be prevented and smoothness of the above slurry layer (coating layer) may be improved.

Examples of the antioxidant include a phenol compound, a hydroquinone compound, an organophosphorus compound, a sulfur compound, a phenylenediamine compound, and a polymer type phenol compound. The polymer type phenol compound is a polymer having a phenol structure in a molecule. A weight average molecular weight of the polymer type phenol compound is preferably 200 to 1,000, more preferably 600 to 700.

Examples of the thickener include: a cellulosic polymer, such as carboxymethyl cellulose, methyl cellulose, and hydroxypropyl cellulose, as well as an ammonium salt and an alkali metal salt thereof; (modified) poly(meth)acrylic acid as well as an ammonium salt and an alkali metal salt thereof; polyvinyl alcohols, such as (modified) polyvinyl alcohol, a copolymer of acrylic acid or acrylate and vinyl alcohol, a copolymer of maleic anhydride, maleic acid, or fumaric acid and vinyl alcohol; polyethylene glycol, polyethylene oxide, polyvinylpyrrolidone, modified polyacrylic acid, oxidized starch, phosphoric acid starch, casein, various modified starches, and an acrylonitrile-butadiene copolymer hydride.

Examples of the dispersion (emulsion) include styrene-butadiene-based copolymer latex, polystyrene-based polymer latex, polybutadiene-based polymer latex, acrylonitrile-butadiene-based copolymer latex, polyurethane-based polymer latex, polymethylmethacrylate-based polymer latex, methylmethacrylate-butadiene-based copolymer latex, polyacrylate-based polymer latex, vinyl chloride-based polymer latex, vinyl acetate-based polymer emulsion, vinyl acetate-ethylene-based copolymer emulsion, polyethylene emulsion, carboxy-modified styrene-butadiene copolymer resin emulsion, acrylic resin emulsion, polyethylene, polypropylene, polyethylene terephthalate, polyamide (PA), polyimide (PI), polyamide-imide (PAI), an aromatic polyamide, alginic acid and a salt thereof, polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), and an ethylene tetrafluoroethylene (ETFE) copolymer.

Moreover, the dispersion (emulsion) may be contained in a larger amount than the above additive content. The upper limit and lower limit of the content of the dispersion (emulsion) with respect to 100% by mass of the component (A) are, for example, 20% by mass, 19% by mass, 17% by mass, 15% by mass, 13% by mass, 10% by mass, 9% by mass, 7% by mass, 5% by mass, 4% by mass, 2% by mass, 1% by mass, and 0% by mass. In one embodiment, from the viewpoints of springback resistance and discharge capacity retention rate, the amount of the dispersion (emulsion) added with respect to 100% by mass of the component (A) is preferably less than 5% by mass.

A binder aqueous solution for a lithium-ion battery electrode may be used as a binder aqueous solution for a lithium-ion battery negative electrode, or a binder aqueous solution for a lithium-ion battery positive electrode.

<Slurry for Lithium-ion Battery Electrode: Also Referred to as Slurry>

The disclosure provides a slurry for a lithium-ion battery electrode, the slurry containing the above binder aqueous solution for a lithium-ion battery electrode and an electrode active material (B).

In the disclosure, "slurry" means a suspension of liquid and solid particles.

The upper limit and lower limit of the content of the component (A) with respect to 100% by mass of the above slurry are, for example, 99.9% by mass, 95% by mass, 90% by mass, 85% by mass, 80% by mass, 75% by mass, 70% by mass, 65% by mass, 60% by mass, 55% by mass, 50% by mass, 45% by mass, 40% by mass, 35% by mass, 30% by mass, 25% by mass, 20% by mass, 15% by mass, 10% by mass, 5% by mass, 4% by mass, 2% by mass, 1% by mass, 0.9% by mass, 0.5% by mass, 0.2% by mass, and 0.1% by mass. In one embodiment, the above content is preferably 0.1% by mass to 99.9% by mass.

Examples of the water include ultrapure water, pure water, distilled water, ion-exchanged water, and tap water.

The upper limit and lower limit of the content of the water with respect to 100% by mass of the above slurry are, for example, 70% by mass, 65% by mass, 60% by mass, 55% by mass, 50% by mass, 45% by mass, 40% by mass, 35% by mass, and 30% by mass. In one embodiment, the above content is preferably 30% by mass to 70% by mass.

<Electrode Active Material (B)>

An electrode active material may be used singly or in combination of two or more. Examples of the electrode active material include a negative electrode active material and a positive electrode active material.

The negative electrode active material is not particularly limited as long as being capable of reversibly occluding and releasing lithium, and an appropriate material may be suitably selected depending on the type of the target lithium-ion battery. The negative electrode active material may be used singly or in combination of two or more. Examples of the negative electrode active material include a carbon material, as well as a material alloyable with lithium, such as a silicon material, a lithium atom-containing oxide, a lead compound, a tin compound, an arsenic compound, an antimony compound, and an aluminum compound.

Examples of the above carbon material include graphite (for example, natural graphite and artificial graphite) which is highly crystalline carbon, low crystalline carbon (such as soft carbon and hard carbon), carbon black (such as Ketjen black, acetylene black, channel black, lamp black, oil furnace black, and thermal black), a fullerene, a carbon nanotube, a carbon nanofiber, a carbon nanohorn, a carbon fibril, mesocarbon microbeads (MCMB), and a pitch-based carbon fiber.

Examples of the above silicon material include, in addition to silicon, silicon oxide and silicon alloy, silicon oxide composites expressed by SiC, $SiO_xC_y$ (in which $0<x\leq3$, and $0<y\leq5$), $Si_3N_4$, $Si_2N_2O$, and $SiO_x$ (in which $0<x\leq2$) (for example, materials described in Japanese Patent Laid-Open Nos. 2004-185810 and 2005-259697), and a silicon material described in Japanese Patent Laid-Open No. 2004-185810. In addition, silicon materials described in Japanese Patent Nos. 5390336 and 5903761 may also be used.

The above silicon oxide is preferably a silicon oxide expressed by a composition formula $SiO_x$ (in which $0<x<2$, preferably $0.1\leq x\leq1$).

The above silicon alloy is preferably an alloy of silicon and at least one transition metal selected from the group consisting of titanium, zirconium, nickel, copper, iron and molybdenum. Silicon alloys of these transition metals are preferable due to high electronic conductivity and high strength. The silicon alloy is more preferably a silicon-nickel alloy or a silicon-titanium alloy, particularly preferably a silicon-titanium alloy. A content ratio of silicon in the silicon alloy is preferably 10 mol % or more, more preferably 20 mol % to 70 mol %, with respect to 100 mol % of metal elements in the above silicon alloy. The silicon material may be single crystalline, polycrystalline, or amorphous.

When the silicon material is used as the electrode active material, an electrode active material other than the silicon material may be used together. Examples of such an electrode active material include the above carbon material; a conductive polymer such as polyacene; a composite metal oxide expressed by $A_XB_YO_Z$ (in which A represents an alkali metal or a transition metal, B represents at least one selected from transition metals such as cobalt, nickel, aluminum, tin, and manganese, 0 represents an oxygen atom, and X, Y, and Z are respectively numbers in the following ranges: $0.05<X<1.10$, $0.85<Y<4.00$ and $1.5<Z<5.00$), or other metal oxide. When the silicon material is used as the electrode active material, it is preferable to use a carbon material together because a volume change associated with the occlusion and release of lithium is small.

Examples of the above lithium atom-containing oxide include a ternary nickel cobalt lithium manganate, a lithium-transition metal composite oxide, such as a lithium-manganese composite oxide (such as $LiMn_2O_4$), a lithium-nickel composite oxide (such as $LiNiO_2$), a lithium-cobalt composite oxide (such as $LiCoO_2$), a lithium-iron composite oxide (such as $LiFeO_2$), a lithium-nickel-manganese composite oxide (such as $LiNi_{0.5}Mn_{0.5}O_2$), a lithium-nickel-cobalt composite oxide (such as $LiNi_{0.8}Co_{0.2}O_2$), a lithium-transition metal phosphate compound (such as $LiFePO_4$), a lithium-transition metal sulfate compound (such as $Li_xFe_2(SO_4)_3$), a lithium-titanium composite oxide (such as lithium titanate: $Li_4Ti_5O_{12}$), and other conventionally known electrode active materials.

From the viewpoint of remarkably exhibiting the effects of the disclosure, the carbon material and/or the material alloyable with lithium is preferably contained in the electrode active material in an amount of 50% by mass or more, more preferably 80% by mass or more, further preferably 90% by mass or more, and particularly preferably 100% by mass.

In one embodiment, the electrode active material (B) is preferably a negative electrode active material containing 1% by mass or more (for example, 2% by mass or more, 5% by mass or more, 10% by mass or more, 25% by mass or more, 50% by mass or more, 75% by mass or more, 90% by mass or more, or 100% by mass) of silicon and/or a silicon oxide covered with a carbon layer.

The positive electrode active material is roughly classified into an active material containing an inorganic compound and an active material containing an organic compound. Examples of the inorganic compound contained in the positive electrode active material include a metal oxide. Examples of the metal oxide include a transition metal oxide, a composite oxide of lithium and a transition metal, and a transition metal sulfide. Examples of the above transition metal include Fe, Co, Ni, Mn, and Al. Examples of the inorganic compound used in the positive electrode active material include: a lithium-containing composite metal oxide, such as $LiCoO_2$, $LiNiO_2$, $LiMnO_2$, $LiMn_2O_4$, $LiFePO_4$, $LiNi_{1/2}Mn_{3/2}O_4$, $LiCo_{1/3}Ni_{1/3}Mn_{1/3}O_2$, $LiCoO_{0.3}Ni_{0.5}Mn_{0.2}O_2$, $LiCoO_{0.2}Ni_{0.6}Mn_{0.2}O_2$, $LiCo_{0.1}Ni_{0.8}Mn_{0.1}O_2$, $LiCo_{0.15}Ni_{0.8}Al_{0.05}O_2$, $Li[Li_{0.1}Al_{0.1}Mn_{1.8}]O_4$, and $LiFeVO_4$; a transition metal sulfide, such as $TiS_2$, $TiS_3$, and amorphous $MoS_2$; and a transition metal oxide, such as $Cu_2V_2O_3$, amorphous $V_2O—P_2O_5$, $MoO_3$, $V_2O_5$, and $V_6O_{13}$. These compounds may be partially element-substituted. Examples of the organic compound contained in the positive electrode active material include a conductive polymer, such as polyacetylene and poly-p-phenylene. An iron-based oxide having poor electric conductivity may be used as an electrode active material covered with a carbon material by allowing a carbon source material to exist during reduction firing. These compounds may be partially element-substituted. Among them, from the viewpoints of practicality, electrical characteristics and long life, $LiCoO_2$, $LiNiO_2$, $LiMnO_2$, $LiMn_2O_4$, $LiFePO_4$, $LiNi_{1/2}Mn_{3/2}O_4$, $LiCo_{1/3}Ni_{1/3}Mn_{1/3}O_2$, $LiCo_{0.3}Ni_{0.5}Mn_{0.2}O_2$, $LiCo_{0.2}Ni_{0.6}Mn_{0.2}O_2$, $LiCo_{0.1}Ni_{0.8}Mn_{0.1}O_2$, $LiCo_{0.15}Ni_{0.8}Al_{0.05}O_2$, and $Li[Li_{0.1}Al_{0.1}Mn_{1.8}]O_4$ are preferable.

In one embodiment, the electrode active material (B) is preferably a positive electrode active material containing iron phosphate and/or a metal oxide.

The shape of the electrode active material is not particularly limited and may be an arbitrary shape such as a fine particle shape or a thin film shape, and a fine particle shape is preferable. An average particle diameter of the electrode active material is not particularly limited, and its upper limit and lower limit are, for example, 50 μm, 45 μm, 40 μm, 35 μm, 30 μm, 25 μm, 20 μm, 15 μm, 10 μm, 5 μm, 4 μm, 3 μm, 2.9 μm, 2 μm, 1 μm, 0.5 μm, and 0.1 μm. In one embodiment, from the viewpoint of forming a uniform and thin coating film, more specifically, for the reason that handleability is good if the average particle diameter is 0.1 μm or more and application of an electrode is easy if the average particle diameter is 50 μm or less, the average particle diameter of the electrode active material is preferably 0.1 μm to 50 μm, more preferably 0.1 μm to 45 μm, further preferably 1 μm to 10 μm, and particularly preferably 5 μm.

In the disclosure, "particle diameter" means a maximum distance among distances between arbitrary two points on a contour line of a particle (the same applies hereinafter). In addition, in the disclosure, unless otherwise specified, "average particle diameter" means a value calculated as an average value of particle diameters of particles observed in several to several tens of visual fields using an observation means such as a scanning electron microscope (SEM) or a transmission electron microscope (TEM) (the same applies hereinafter).

The upper limit and lower limit of the content of the component (A) in the above slurry with respect to 100% by mass of the electrode active material (B) are, for example, 15% by mass, 14% by mass, 13% by mass, 12% by mass, 11% by mass, 10% by mass, 9% by mass, 8% by mass, 7% by mass, 6% by mass, 5% by mass, 4% by mass, 3% by mass, 2% by mass, 1.5% by mass, 1% by mass, and 0.5 mass %. In one embodiment, the content of the component (A) with respect to 100% by mass of the electrode active material (B) is preferably 0.5% by mass to 15% by mass.

<Conductive Aid>

In one embodiment, a conductive aid may be contained in the above slurry. Examples of the conductive aid include fibrous carbon such as vapor grown carbon fiber (VGCF), a carbon nanotube (CNT) and carbon nanofiber (CNF), carbon black such as graphite particles, acetylene black, Ketjen black and furnace black, and fine powders of Cu, Ni, Al, Si or alloys thereof having an average particle diameter of 10 μm or less. The content of the conductive aid is not particularly limited, and is preferably 0% by mass to 10% by mass, more preferably 0.5% by mass to 6% by mass, with respect to the electrode active material component.

<Slurry Viscosity Adjustment Solvent>

A slurry viscosity adjustment solvent is not particularly limited, and may include a non-aqueous medium having a normal boiling point of 80° C. to 350° C. The slurry viscosity adjustment solvent may be used singly or in combination of two or more. Examples of the slurry viscosity adjustment solvent include: an amide solvent, such as N-methylpyrrolidone, dimethylformamide, and N,N-dimethylacetamide; a hydrocarbon solvent, such as toluene, xylene, n-dodecane, and tetralin; an alcohol solvent, such as methanol, ethanol, 2-propanol, isopropyl alcohol, 2-ethyl-1-hexanol, 1-nonanol, and lauryl alcohol; a ketone solvent, such as acetone, methyl ethyl ketone, cyclohexanone, phorone, acetophenone, and isophorone; an ether solvent, such as dioxane and tetrahydrofuran (THF); an ester solvent, such as benzyl acetate, isopentyl butyrate, methyl lactate, ethyl lactate, and butyl lactate; an amine solvent, such as o-toluidine, m-toluidine, and p-toluidine; a lactone, such as γ-butyrolactone and δ-butyrolactone; a sulfoxide and sulfone solvent, such as dimethyl sulfoxide and sulfolane; and water. Among them, N-methylpyrrolidone is preferable from the viewpoint of application workability. The content of the above non-aqueous medium is not particularly limited, and is preferably 0% by mass to 10% by mass with respect to 100% by mass of the above slurry.

The above slurry may contain, as an additive, a component that does not correspond to any of the component (A), the component (B), water, the conductive aid, and the slurry viscosity adjustment solvent without impairing the effects of the disclosure. Examples of the additive include those described above.

The content of the additive is, for example, 0% by mass to 5% by mass, less than 1% by mass, less than 0.1% by mass, less than 0.01% by mass, or 0% by mass, with respect to 100% by mass of the component (A).

The content of the additive with respect to 100% by mass of the component (B) is, for example, 0% by mass to 5% by mass, less than 1% by mass, less than 0.1% by mass, less than 0.01% by mass, or 0% by mass.

Moreover, the dispersion (emulsion) may be contained in a larger amount than the above additive content. The upper limit and lower limit of the content of the dispersion (emulsion) with respect to 100% by mass of the slurry for a lithium-ion battery electrode are, for example, 20% by mass, 19% by mass, 17% by mass, 15% by mass, 13% by mass, 10% by mass, 9% by mass, 7% by mass, 5% by mass, 4% by mass, 2% by mass, 1% by mass, and 0% by mass.

In one embodiment, from the viewpoints of springback resistance and discharge capacity retention rate, the amount of the dispersion (emulsion) added with respect to 100% by mass of the above aqueous solution or the above slurry for a lithium-ion battery electrode is preferably less than 5% by mass.

The above slurry for a lithium-ion battery electrode may be used as a slurry for a lithium-ion battery negative electrode or a slurry for a lithium-ion battery positive electrode.

The above slurry is prepared by mixing the component (A), the component (B), water, and if necessary, the conductive aid and the slurry viscosity adjustment solvent.

Examples of a means of mixing the slurry include a ball mill, a sand mill, a pigment disperser, a Raikai mixer, an ultrasonic disperser, a homogenizer, a planetary mixer, and a Hobart mixer.

[Lithium-Ion Battery Electrode]

The disclosure provides a lithium-ion battery electrode, obtained by applying the above slurry for a lithium-ion battery electrode to a current collector, and drying and curing the slurry. The above lithium-ion battery electrode has a cured product of the above slurry for a lithium-ion battery electrode on a surface of the current collector.

As the current collector, various known ones may be used without particular limitation. A material of the current collector is not particularly limited, and examples thereof include a metal material, such as copper, iron, aluminum, nickel, stainless steel, and nickel-plated steel, or a carbon material, such as carbon cloth and carbon paper. The form of the current collector is not particularly limited. In the case of metal material, examples thereof include a metal foil, a metal cylinder, a metal coil, and a metal plate; in the case of carbon material, examples thereof include a carbon plate, a carbon thin film, and a carbon cylinder. Among them, when an electrode active material is used in the negative electrode, a copper foil is preferably used as the current collector because it is currently used in industrialized products.

The application means is not particularly limited, and examples thereof include a conventionally known coating device, such as a comma coater, a gravure coater, a micro gravure coater, a die coater, and a bar coater.

The drying means is also not particularly limited, and the temperature is preferably 60° C. to 200° C., more preferably 100° C. to 195° C. The atmosphere may be dry air or an inert atmosphere.

The thickness of the electrode (cured product) is not particularly limited, and is preferably 5 μm to 300 μm, more preferably 10 μm to 250 μm. By setting the above range, a function of occluding and releasing sufficient lithium with respect to a high-density current value may be easily obtained.

The above lithium-ion battery electrode may be used as a lithium-ion battery negative electrode or a lithium-ion battery positive electrode.

[Lithium-Ion Battery]

The disclosure provides a lithium-ion battery including the above lithium-ion battery electrode. The above battery also includes an electrolytic solution and a packaging material, which are not particularly limited.

(Electrolytic Solution)

Examples of the electrolytic solution include non-aqueous electrolytic solution in which a supporting electrolyte is dissolved in a non-aqueous solvent. In addition, a film forming agent may be contained in the above non-aqueous electrolytic solution.

As the non-aqueous solvent, various known ones may be used without particular limitation, and may be used singly or in combination of two or more. Examples of the non-aqueous solvent include: a chain carbonate solvent, such as diethyl carbonate, dimethyl carbonate, and ethyl methyl carbonate; a cyclic carbonate solvent, such as ethylene carbonate, propylene carbonate, and butylene carbonate; a chain ether solvent, such as 1,2-dimethoxyethane; a cyclic ether solvent, such as tetrahydrofuran, 2-methyltetrahydrofuran, sulfolane, and 1,3-dioxolane; a chain ester solvent, such as methyl formate, methyl acetate, and methyl propionate; a cyclic ester solvent, such as γ-butyrolactone and γ-valerolactone; and acetonitrile. Among them, a combination of mixed solvents containing a cyclic carbonate and a chain carbonate is preferable.

A lithium salt is used as the supporting electrolyte. As the lithium salt, various known ones may be used without particular limitation, and may be used singly or in combination of two or more. Examples of the supporting electrolyte include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among them, $LiPF_6$, $LiClO_4$ and $CF_3SO_3Li$, which are easily dissolved in a solvent and exhibit a high dissociation degree, are preferable. The higher the dissociation degree of the supporting electrolyte, the higher the lithium-ion conductivity. Therefore, the lithium-ion conductivity can be adjusted according to the type of the supporting electrolyte.

As the film forming agent, various known ones may be used without particular limitation, and may be used singly or in combination of two or more. Examples of the film forming agent include: a carbonate compound, such as vinylene carbonate, vinyl ethylene carbonate, vinyl ethyl carbonate, methylphenyl carbonate, fluoroethylene carbonate, and difluoroethylene carbonate; an alkene sulfide, such as ethylene sulfide and propylene sulfide; a sultone compound, such as 1,3-propane sultone and 1,4-butane sultone; and an acid anhydride, such as maleic anhydride and succinic anhydride. The content of the film forming agent in the electrolyte solution is not particularly limited, and is 10% by mass or less, 8% by mass or less, 5% by mass or less, or 2% by mass or less, in order of preference. By setting the content to 10% by mass or less, the advantages of the film forming agent, such as suppression of initial irreversible capacity or improvement in low temperature characteristics and rate characteristics, may be easily achieved.

The form of the above lithium-ion battery is not particularly limited. Examples of the form of the lithium-ion battery include a cylinder type in which a sheet electrode and a separator are formed in a spiral shape, a cylinder type having an inside-out structure in which a pellet electrode and a separator are combined, and a coin type in which a pellet electrode and a separator are laminated. In addition, by accommodating the battery of these forms in an arbitrary exterior case, the battery can be used in an arbitrary shape such as a coin shape, a cylindrical shape, and a square shape.

A method for producing the above lithium-ion battery is not particularly limited, and the lithium-ion battery may be assembled by an appropriate procedure depending on the structure of the battery. Examples of the method for producing a lithium-ion battery include a method described in Japanese Patent Laid-Open No. 2013-089437. The battery can be produced in the following manner. A negative electrode is placed on an exterior case, an electrolytic solution and a separator are provided thereon, a positive electrode is further placed so as to face the negative electrode, and the positive electrode is fixed with a gasket and a sealing plate.

EXAMPLES

Hereinafter, the disclosure will be specifically described through examples and comparative examples. However, the above description of the preferred embodiments and the following examples are provided for illustration only and not for limiting the disclosure. Therefore, the scope of the disclosure is not limited to the embodiments or examples specifically described herein, but only by the claims. In addition, in each of the examples and comparative examples, unless otherwise specified, numerical values such as part and % and are based on mass.

1. Preparation of Component (A)

Preparation Example 1

In a reactor equipped with a stirrer, a thermometer, a reflux condenser and a nitrogen gas introduction pipe, 1,450 g of ion-exchanged water, 137.3 g (1.5580 mol) of hydroxyethyl vinyl ether, 188.6 g (1.3266 mol) of 50% acrylamide aqueous solution and 0.09 g (0.0006 mol) of sodium methallyl sulfonate were put, and after oxygen in the reaction system was removed through nitrogen gas, the resultant was heated to 50° C. 2.3 g of 2,2'-azobis-2-amidinopropane dihydrochloride (product name "NC-32" made by NIPPOH CHEMICALS CO., LTD.) and 50 g of ion-exchanged water were put therein, the resultant was heated to 80° C. and reacted for 3 hours, and an aqueous solution containing a water-soluble polymer was obtained.

Preparation Example 2

In a reactor equipped with a stirrer, a thermometer, a reflux condenser and a nitrogen gas introduction pipe, 550 g of ion-exchanged water was put, and after oxygen in the reaction system was removed through nitrogen gas, the resultant was heated to 80° C. A mixed solution of 99.0 g (1.1236 mol) of hydroxyethyl vinyl ether, 870.8 g (6.1241 mol) of 50% acrylamide aqueous solution, 0.2 g (0.0014 mol) of sodium methallyl sulfonate and 100 g of ion-exchanged water, as well as a mixed solution of 5.3 g of 2,2'-azobis-2-amidinopropane dihydrochloride (product name "NC-32" made by NIPPOH CHEMICALS CO., LTD.) and 170 g of ion-exchanged water were respectively added dropwise thereto. The mixed solutions were added dropwise for 3 hours while being kept at 80° C., and an aqueous solution containing a water-soluble polymer was obtained.

Preparation Examples 3 and 4

An aqueous solution containing a water-soluble polymer was prepared in the same manner as in Preparation Example 1 except that the monomer composition in Preparation Example 1 was changed to those shown in Table 1.

Preparation Example 5

In a reactor equipped with a stirrer, a thermometer, a reflux condenser and a nitrogen gas introduction pipe, 1,340 g of ion-exchanged water, 68.8 g (0.7806 mol) of hydroxyethyl vinyl ether, 237.0 g (1.6669 mol) of 50% acrylamide aqueous solution, 55.2 g (0.6123 mol) of 80% acrylic acid and 0.24 g (0.0015 mol) of sodium methallyl sulfonate were put, and after oxygen in the reaction system was removed through nitrogen gas, the resultant was heated to 50° C. 2.3 g of 2,2'-azobis-2-amidinopropane dihydrochloride (product name "NC-32" made by NIPPOH CHEMICALS CO., LTD.) and 50 g of ion-exchanged water were put therein, and the resultant was heated to 80° C. and reacted for 3 hours. After that, 51.0 g (0.6123 mol) of 48% sodium hydroxide aqueous solution was added as a neutralizer and stirred, ion-exchanged water was added so as to achieve a solid content concentration of 13%, and an aqueous solution containing a water-soluble polymer was obtained.

Preparation Examples 6 and 7

An aqueous solution containing a water-soluble polymer was prepared in the same manner as in Preparation Example 5 except that the monomer composition in Preparation Example 5 was changed to those shown in Table 1.

Comparative Preparation Example 1

In a reactor equipped with a stirrer, a thermometer, a reflux condenser and a nitrogen gas introduction pipe, 1,310 g of ion-exchanged water, 462.9 g (3.2549 mol) of 50% acrylamide aqueous solution, and 0.26 g (0.0016 mol) of sodium methallyl sulfonate were put, and after oxygen in the reaction system was removed through nitrogen gas, the resultant was heated to 50° C. 2.3 g of 2,2'-azobis-2-amidinopropane dihydrochloride (product name "NC-32" made by NIPPOH CHEMICALS CO., LTD.) and 50 g of ion-exchanged water were put therein, the resultant was heated to 80° C. and reacted for 3 hours, and an aqueous solution containing a water-soluble polymer was obtained.

Comparative Preparation Example 2

An aqueous solution containing a water-soluble polymer was prepared in the same manner as in Comparative Preparation Example 1 except that the monomer composition in Comparative Preparation Example 1 was changed to those shown in Table 1.

Comparative Preparation Example 3

In a reactor equipped with a stirrer, a thermometer, a reflux condenser and a nitrogen gas introduction pipe, 1,400 g of ion-exchanged water, 200.9 g (1.4129 mol) of 50% acrylamide aqueous solution, 46.8 g (0.5194 mol) of 80% acrylic acid, 76.9 g (0.6623 mol) of 2-hydroxyethyl acrylate and 0.41 g (0.0026 mol) of sodium methallylsulfonate were put, and after oxygen in the reaction system was removed through nitrogen gas, the resultant was heated to 50° C. 2.2 g of 2,2'-azobis-2-amidinopropane dihydrochloride (product name "NC-32" made by NIPPOH CHEMICALS CO., LTD.) and 50 g of ion-exchanged water were put therein, and the resultant was heated to 80° C. and reacted for 3 hours. After that, 34.6 g (0.4156 mol) of 48% sodium hydroxide aqueous solution was added as a neutralizer and stirred, ion-exchanged water was added so as to achieve a solid content concentration of 13%, and an aqueous solution containing a water-soluble polymer was obtained.

Comparative Preparation Example 4

An aqueous solution containing a water-soluble polymer was prepared in the same manner as in Comparative Preparation Example 3 except that the monomer composition and the amount of the neutralizer in Comparative Preparation Example 3 were changed to those shown in Table 1.

B-Type Viscosity

The viscosity of each binder aqueous solution was measured at 25° C. under the following conditions using a B-type viscometer (product name "B-type Viscometer Model BM" made by Toki Sangyo Co., Ltd.).

When the viscosity was 100,000 mPa·s to 20,000 mPa·s: No. 4 rotor was used at a rotational speed of 6 rpm; When the viscosity was less than 20,000 mPa·s: No. 3 rotor was used at a rotational speed of 6 rpm.

Weight Average Molecular Weight

The weight average molecular weight was calculated as a value in terms of polyacrylic acid as measured by gel permeation chromatography (GPC) under a 0.2 M phosphate buffer/acetonitrile solution (90/10, PH 8.0). HLC-8220 (made by Tosoh Corporation) was used as a GPC device, and SB-806M-HQ (made by SHODEX) was used as a column.

Gel Fraction 10 g of a binder aqueous solution for a lithium-ion battery electrode, which contained the component (A), was put in an ointment can (product name "Ointment Can made of tinplate" made by SOGO LABORATORY GLASS WORKS CO., LTD.), and after drying at 120° C. for 4 hours by a circulating air dryer (product name "Blower Constant Temperature Dryer DSR420DA" made by Advantec Toyo Kaisha, Ltd.), a solid resin after thermal crosslinking was obtained. The mass of the solid resin was accurately measured at 25° C. by a mass meter (product name "Standard Balance CPA324S" made by Sartorius Japan K.K.). The measured solid resin was transferred to a container (300 mL beaker) containing 150 mL of pure water, and after immersion in water at 25° C. for 3 hours under stirring by a magnetic stirrer (product name "Powerful Magnetic Stirrer RCX-1000D" made by Tokyo Rikakikai Co., Ltd.), the resultant was filtered under reduced pressure by filter paper ("No. 50B" made by Kiriyama Glass Works Co.) using a Kiriyama funnel (product name "KIRIYAMA ROHTO SB-60" made by Kiriyama Glass Works Co.) and a suction bell (product name "Suction Bell VKB-200" made by Kiriyama Glass Works Co.). After that, an insoluble residue remaining on the filter paper was dried at 120° C. for 3 hours by the above circulating air dryer, followed by an accurate measurement of the mass of the insoluble residue by the above mass meter at 25° C., and a gel fraction of the resin after thermal crosslinking of the water-soluble binder for a battery was calculated from the following equation.

$$\text{Gel fraction}(\%)=\{\text{insoluble residue }(g)/\text{mass }(g)\text{ of solid resin}\}\times 100$$

Evaluation of Curling

Curling was evaluated as follows.

Two adjacent sides of an aluminum foil cut into 50 mm×50 mm were fixed to a glass plate with a tape, a binder aqueous solution was uniformly applied to a surface of the aluminum foil to a thickness of 400 μm by a doctor blade method, and dried for 5 minutes by a circulating air dryer (product name "DRS420DA" made by ADVANTEC) set to 120° C. The resultant was taken out from the dryer and left to stand for 2 minutes, followed by measurement of the height from a corner not fixed with the tape to the glass surface. The higher the height, the greater the curling. Curling of a binder film correlates with curling at the time when the binder film is used as an electrode. The greater the curling of the binder film, the greater the curling of the binder film when used as an electrode, and there is a possibility that problems such as peeling may occur in an electrode production process.

An evaluation was performed as follows based on the numerical values of the height.

A: Less than 10 mm
B: 10 mm or more and less than 20 mm
C: 20 mm or more

TABLE 1

| | Hydroxyl group-containing vinyl ether (a) | | (Meth)acrylamide group-containing compound (b) | | Unsaturated organic acid or inorganic salt thereof (c) | Copolymerizable monomer (d) | | |
|---|---|---|---|---|---|---|---|---|
| | HEVE (mol %) | DEGV (mol %) | AM (mol %) | DMAA (mol %) | AA (mol %) | AN (mol %) | HEA (mol %) | SMAS (mol %) |
| Preparation Example 1 | 54.00 | | 45.98 | | | | | 0.02 |
| Preparation Example 2 | 15.50 | | 84.48 | | | | | 0.02 |
| Preparation Example 3 | | 25.00 | 74.98 | | | | | 0.02 |
| Preparation Example 4 | 26.00 | 13.00 | 60.98 | | | | | 0.02 |
| Preparation Example 5 | 25.50 | | 54.45 | | 20.00 | | | 0.05 |
| Preparation Example 6 | 18.00 | | 15.95 | 46.00 | 20.00 | | | 0.05 |
| Preparation Example 7 | 14.50 | | 51.45 | | 26.50 | 7.50 | | 0.05 |
| Comparative Preparation Example 1 | | | 99.95 | | | | | 0.05 |
| Comparative Preparation Example 2 | 1.50 | | 98.45 | | | | | 0.05 |
| Comparative Preparation Example 3 | | | 54.40 | | 20.00 | | 25.50 | 0.10 |
| Comparative Preparation Example 4 | | | 54.40 | | 20.00 | | 25.50 | 0.10 |

| | Neutralizer (amount with respect to acid component (c)) NaOH (mol %) | B-type viscosity (mPa · s) | Molecular weight (Mw) | Gel fraction (%) | Evaluation of curling |
|---|---|---|---|---|---|
| Preparation Example 1 | — | 2,300 | 480,000 | 87 | A |
| Preparation Example 2 | — | 2,100 | 410,000 | 58 | B |
| Preparation Example 3 | — | 3,200 | 530,000 | 70 | A |
| Preparation Example 4 | — | 2,700 | 510,000 | 76 | A |
| Preparation Example 5 | 100 | 4,400 | 580,000 | 69 | A |
| Preparation Example 6 | 100 | 4,900 | 590,000 | 52 | A |
| Preparation Example 7 | 100 | 4,700 | 550,000 | 48 | B |
| Comparative Preparation Example 1 | — | 21,000 | 720,000 | 0 | C |
| Comparative Preparation Example 2 | — | 16,000 | 690,000 | 11 | C |
| Comparative Preparation Example 3 | 80 | 4,700 | 690,000 | 74 | A |
| Comparative Preparation Example 4 | 100 | 4,500 | 690,000 | 61 | B |

HEVE: Hydroxyethyl vinyl ether
DEGV: Diethylene glycol monovinyl ether
AM: Acrylamide ("50% Acrylamide" made by Mitsubishi Chemical Corporation)
DMAA: N,N-dimethyl(meth)acrylamide ("DMAA" made by KJ Chemicals Corporation)
AA: Acrylic acid ("80% Acrylic Acid" made by Osaka Organic Chemical Industry Ltd.)
AN: Acrylonitrile ("Acrylonitrile" made by Mitsubishi Chemical Corporation)
HEA: 2-hydroxyethyl acrylate ("HEA" made by Osaka Organic Chemical Industry Ltd.)
SMAS: Sodium methallyl sulfonate
NaOH: Sodium hydroxide ("48% Sodium Hydroxide Solution" made by Kanto Chemical Co., Inc.)

2. Preparation of Slurry for Electrode, Cell Production and Evaluation

Example 1-1: Evaluation of Electrode

<Preparation of Slurry for Electrode>

The aqueous solution obtained in Preparation Example 1 in an amount of 3 parts by mass in terms of solid content was mixed with 91 parts of lithium cobalt oxide LCO ($LiCoO_2$, product name "CELLSEED C-5H" made by Nippon Chemical Industrial Co., Ltd.) and 6 parts of acetylene black using a commercially available rotation/revolution mixer ("Awatori Rentaro" made by THINKY CORPORATION) in a container dedicated to the mixer. Ion-exchanged water was added thereto so as to achieve a solid content concentration of 50%, and the container was set in the above mixer. Next, after kneading at 2,000 rpm for 10 minutes, defoaming was performed for 1 minute and a slurry for an electrode was obtained.

<Production of Electrode>

The above slurry for a lithium-ion battery electrode was uniformly applied to a surface of a current collector composed of aluminum foil by a doctor blade method so that a film thickness after drying would be 100 μm. After drying at 60° C. for 30 minutes, the resultant was subjected to a heating treatment at 150° C. in vacuum for 120 minutes. After that, by press processing with a roll press machine to achieve a film (electrode active material layer) density of 3.0 g/cm$^3$, an electrode was obtained.

<Assembly of Lithium Half-Cell>

In an argon-purged glove box, the above electrode was punched and formed to have a diameter of 16 mm, and the resultant was placed inside a packing above an aluminum lower lid of a test cell (made by Nippon Tomcell Co., Ltd.). Next, a separator (product name "Selion P2010" made by CS Tech Co., Ltd.) composed of a polypropylene porous film punched out to a diameter of 24 mm was placed. Further, after 500 μL of electrolytic solution was poured in so that no air could enter, a commercially available metallic lithium foil punched and formed into a size of 16 mm was placed, and an exterior body of the test cell was fastened and sealed with screws. Thereby, a lithium half-cell was assembled. The electrolytic solution used here was a solution in which $LiPF_6$ was dissolved at a concentration of 1 mol/L in a solvent having a mass ratio of ethylene carbonate to ethyl methyl carbonate of 1/1.

Examples 1-2 to 1-8 and Comparative Examples 1-1 to 1-5

A lithium half-cell was obtained in the same manner as in Example 1-1 except that the composition in Example 1-1 was changed to those shown in Table 2.

Example 2-1: Evaluation of Electrode

<Preparation of Slurry for Electrode>

The aqueous solution obtained in Preparation Example 1 in an amount of 5 parts by mass in terms of solid content was mixed with 20 parts by mass of silicon monoxide particles ("CC Powder" made by OSAKA Titanium technologies Co., Ltd.) having a D50 of 5 μm and 80 parts by mass of natural graphite (product name "Z-5F" made by Ito Graphite Co., Ltd.) using a commercially available rotation/revolution mixer ("Awatori Rentaro" made by THINKY CORPORATION) in a container dedicated to the mixer. Ion-exchanged water was added thereto so as to achieve a solid content concentration of 40%, and the container was set in the above mixer. Next, after kneading at 2,000 rpm for 10 minutes, defoaming was performed for 1 minute and a slurry for an electrode was obtained.

<Production of Electrode>

The above slurry for a lithium-ion battery electrode was uniformly applied to a surface of a current collector composed of copper foil by a doctor blade method so that a film thickness after drying would be 80 μm. After drying at 150° C. for 30 minutes, the resultant was subjected to a heating treatment at 150° C. in vacuum for 120 minutes. After that, by press processing with a roll press machine to achieve a film (electrode active material layer) density of 1.5 g/cm$^3$, an electrode was obtained.

<Assembly of Lithium Half-Cell>

A lithium half-cell was produced by the same procedure as in Example 1-1.

Comparative Example 2-1

A lithium half-cell was obtained in the same manner as in Example 2-1 except that the composition in Example 2-1 was changed to those shown in Table 2.

<Test for Storage Stability of Electrode Slurry>

The viscosity (unit: mPa·s) of the electrode slurry was measured by a B-type viscometer and then stored in an oven heated to 40° C. for 3 days. After storage, the viscosity was measured again by the B-type viscometer. A change in viscosity was calculated by the following equation and was evaluated according to the following evaluation criteria.

Change in viscosity(%)=(viscosity of electrode slurry after storage)/(viscosity of electrode slurry before storage)×100

A: Less than 110%
B: 110% or more and less than 120%
C: 120% or more and less than 130%
D: 130% or more <Evaluation of Electrode Flexibility>

The electrode was cut into a width of 10 mm and a length of 70 mm, and was wound around a Teflon™ rod having a diameter of 30 mmØ with an active material layer facing outward. A state of a surface of the active material layer was observed and evaluated according to the following criteria.

A: No cracks and peeling occurred at all in the active material layer bound on the current collector.
B: Cracks were seen in the active material layer bound on the current collector, but no peeling was observed.
C: Cracks were seen and peeling was observed in the active material layer bound on the current collector.

<Evaluation of Electrode Adhesion>

The electrode adhesion was evaluated as follows.

A test piece of 2 cm in width×10 cm in length was cut out from the electrode and fixed with a coating surface facing up. Next, an adhesive tape ("CELLOTAPE™" made by NICHIBAN Co., Ltd.) (specified in JIS Z1522) of 15 mm in width was attached while being pressed onto a surface of an active material layer of the test piece, and then the stress when the adhesive tape was peeled off from one end of the test piece at a speed of 30 mm/min in the 180° direction was measured using a tensile tester ("TENSILON®-100" made by A&D Company, Limited) at 25° C. The measurement was performed five times, the measured stress was converted into a value per width of 15 mm, and an average value thereof was calculated as peel strength. The higher the peel strength, the higher the adhesion strength between the current collector and the active material layer or the binding property between the active materials, indicating that the active material layer is less likely to be peeled from the current collector or the active materials are less likely to be peeled from each other.

The evaluation was performed as follows based on the value of the peel strength.

A: Peel strength was greater than 5 N/m.

B: Peel strength was 1 N/m to 5 N/m.

C: Peel strength was less than 1 N/m.

<Charge and Discharge Measurement>

The lithium half-cell was put in a constant temperature bath set to 25° C. and underwent charging and discharging as follows. The charging was started at a constant current (0.1 C) and was completed (cutoff) when the voltage reached 5.0 V. Next, the discharging was started at a constant current (0.1 C) and was completed (cutoff) when the voltage reached 3.0 V. The above charging and discharging were repeated 30 times.

In the above measurement conditions, "1 C" indicates a current value at which a cell having a certain electric capacity is discharged at a constant current and the discharging is completed in 1 hour. For example, "0.1 C" means a current value at which it takes 10 hours to complete discharging, and "10 C" means a current value at which it takes 0.1 hour to complete discharging.

Example 2-1 and Comparative Example 2-1

<Charge and Discharge Measurement>

The lithium half-cell was put in a constant temperature bath set to 25° C. and underwent charging and discharging as follows. The charging was started at a constant current (0.1 C) and was completed (cutoff) when the voltage reached 0.01 V. Next, the discharging was started at a constant current (0.1 C) and was completed (cutoff) when the voltage reached 1.0 V. The above charging and discharging were repeated 30 times.

<Measurement of Initial Coulombic Efficiency>

The initial Coulombic efficiency was calculated by the following equation from values of initial charge capacity (mAh) and initial discharge capacity (mAh) when a charge and discharge cycle test was carried out at room temperature (25° C.).

Initial Coulombic efficiency={(initial discharge capacity)/(initial charge capacity)}×100

<Measurement of Springback Ratio>

After the charge and discharge cycle test was carried out 30 cycles at room temperature (25° C.), the lithium half-cell was disassembled and the thickness of the electrode was measured. A springback ratio of the electrode was calculated by the following equation.

Springback ratio={(electrode thickness after 30 cycles—current collector thickness)/(electrode thickness before charging and discharging—current collector thickness)}×100-100(%)

<Discharge Capacity Retention Rate>

The discharge capacity retention rate was calculated from the following equation.

Discharge capacity retention rate={(discharge capacity at 30th cycle)/(discharge capacity at 1st cycle)}×100(%)

TABLE 2

| | Active material | | | | | | | | | | |
|---|---|---|---|---|---|---|---|---|---|---|---|
| | LCO Part by mass | NMC Part by mass | Silicon monoxide Part by mass | Natural graphite Part by mass | Binder aqueous solution | Storage stability of electrode slurry | Electrode flexibility | Electrode adhesion | Initial Coulombic efficiency (%) | Springback ratio (%) | Discharge capacity retention rate (%) |
| Example 1-1 | 100 | 0 | 0 | 0 | Preparation Example 1 | A | A | A | 98 | 5 | 98 |
| Example 1-2 | 100 | 0 | 0 | 0 | Preparation Example 2 | A | B | B | 98 | 4 | 97 |
| Example 1-3 | 100 | 0 | 0 | 0 | Preparation Example 3 | A | A | A | 97 | 5 | 98 |
| Example 1-4 | 100 | 0 | 0 | 0 | Preparation Example 4 | A | A | A | 98 | 5 | 98 |
| Example 1-5 | 100 | 0 | 0 | 0 | Preparation Example 5 | A | A | A | 97 | 6 | 97 |
| Example 1-6 | 100 | 0 | 0 | 0 | Preparation Example 6 | A | A | A | 97 | 5 | 98 |
| Example 1-7 | 100 | 0 | 0 | 0 | Preparation Example 7 | A | B | A | 97 | 6 | 97 |
| Example 1-8 | 0 | 100 | 0 | 0 | Preparation Example 1 | A | A | A | 89 | 6 | 98 |
| Example 2-1 | 0 | 0 | 20 | 80 | Preparation Example 5 | A | A | A | 79 | 36 | 92 |
| Comparative Example 1-1 | 100 | 0 | 0 | 0 | Comparative Preparation Example 1 | A | C | C | 97 | 8 | 85 |
| Comparative Example 1-2 | 100 | 0 | 0 | 0 | Comparative Preparation Example 2 | A | C | B | 97 | 7 | 86 |
| Comparative Example 1-3 | 100 | 0 | 0 | 0 | Comparative Preparation Example 3 | C | A | A | 94 | 9 | 90 |
| Comparative Example 1-4 | 100 | 0 | 0 | 0 | Comparative Preparation Example 4 | C | B | B | 92 | 9 | 87 |
| Comparative Example 1-5 | 0 | 100 | 0 | 0 | Comparative Preparation Example 1 | A | C | C | 88 | 8 | 87 |

TABLE 2-continued

| | Active material | | | | | | | | | | |
|---|---|---|---|---|---|---|---|---|---|---|---|
| | LCO Part by mass | NMC Part by mass | Silicon monoxide Part by mass | Natural graphite Part by mass | Binder aqueous solution | Storage stability of electrode slurry | Electrode flexibility | Electrode adhesion | Initial Coulombic efficiency (%) | Springback ratio (%) | Discharge capacity retention rate (%) |
| Comparative Example 2-1 | 0 | 0 | 20 | 80 | Comparative Preparation Example 3 | A | A | A | 72 | 38 | 85 |

LCO: Lithium cobalt oxide ($LiCoO_2$)
NMC: Nickel cobalt lithium manganate ($Li[Ni_{1/3}Mn_{1/3}Co_{1/3}]O_2$)

What is claimed is:

1. A binder aqueous solution for a lithium-ion battery electrode, comprising:

a water-soluble polymer (A), the water-soluble polymer (A) being a polymer of a monomer group containing, with respect to 100 mol % of the monomer group, 10 mol % to 60 mol % of a hydroxyl group-containing vinyl ether (a) and 40 mol % to 90 mol % of (Meth) acrylamide Group-containing Compound (b), the hydroxyl group-containing vinyl ether is represented by general formula (1):

$H_2C{=}CH—R—OH$ (1), wherein in the general formula (1), R represents unsubstituted oxyalkylene group having 1 to 5 carbon atoms, or general formula (2), $$—\!\!\left[O—C_qH_{2q}\right]_n\!—, \quad (2)$$

wherein in the general formula (2), q is an integer of 1 to 3, and n is an integer of 1 or more.

2. The binder aqueous solution for a lithium-ion battery electrode according to claim 1, wherein the monomer group contains 0.01 mol % to 50 mol % of an unsaturated organic acid or an inorganic salt thereof (c).

3. A slurry for a lithium-ion battery electrode, containing the binder aqueous solution for a lithium-ion battery electrode according to claim 1 and an electrode active material (B).

4. A lithium-ion battery electrode, obtained by the slurry for a lithium-ion battery electrode according to claim 3, wherein the slurry has been applied to a current collector and dried and cured.

5. A lithium-ion battery, comprising the lithium-ion battery electrode according to claim 4.

6. A slurry for a lithium-ion battery electrode, containing the binder aqueous solution for a lithium-ion battery electrode according to claim 2 and an electrode active material (B).

* * * * *